INVENTOR:
THOMAS A. KIERCE

ATTORNEYS

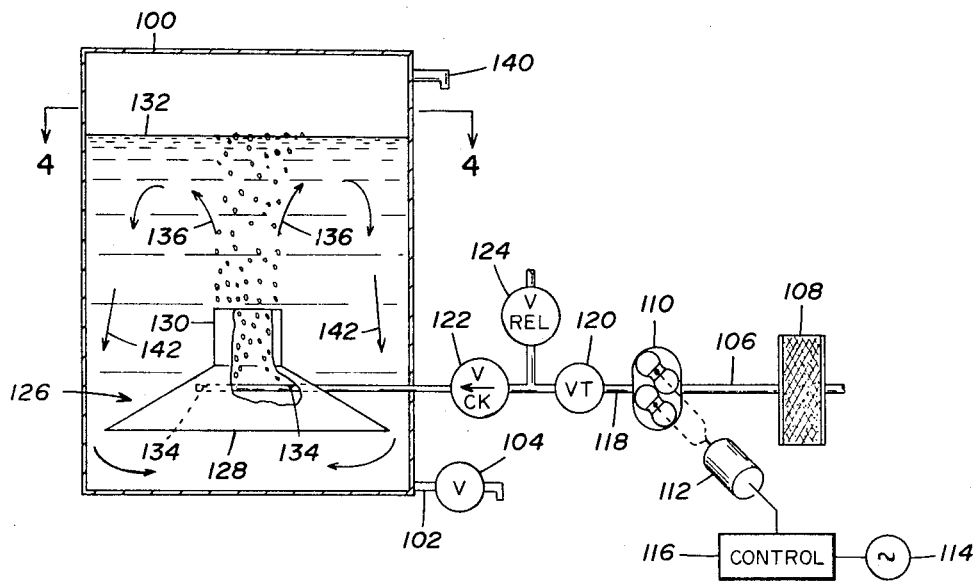
FIG. 3
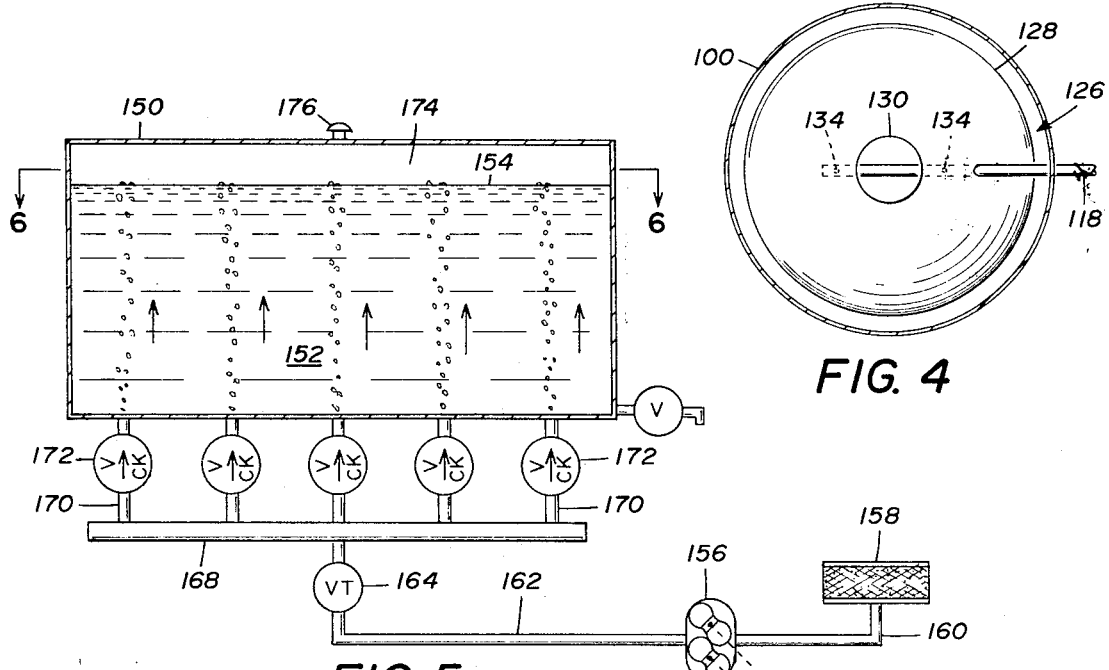
FIG. 4
FIG. 5
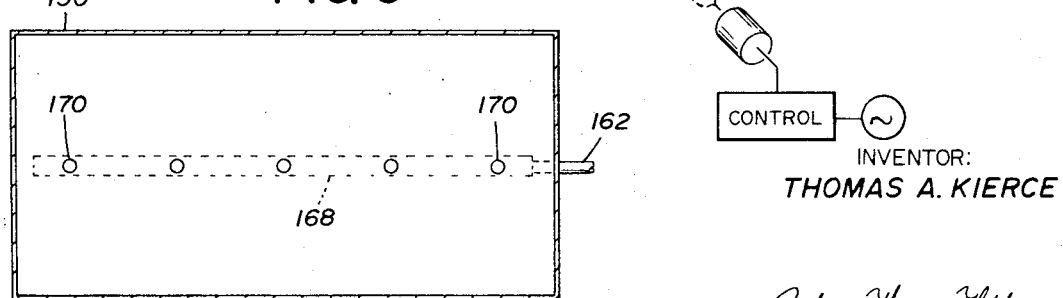
FIG. 6
INVENTOR:
THOMAS A. KIERCE
ATTORNEYS United States Patent Office 3,711,330
Patented Jan. 16, 1973

3,711,330
METHOD AND APPARATUS FOR HEATING
VISCOUS SUGAR SOLUTIONS
Thomas A. Kierce, 724 E. Grauwyler Road,
Irving, Tex. 75061
Filed Aug. 23, 1971, Ser. No. 174,087
Int. Cl. B65d 87/38
U.S. Cl. 127—9
20 Claims

ABSTRACT OF THE DISCLOSURE

A system for heating viscous sugar-containing liquids includes a positive displacement rotary blower which both compresses and heats air for introduction into a storage container for the liquids. The inlet temperature of the air into the container is controlled by a throttling valve. Preferably the air being compressed is extracted from the free air space in the container holding the liquid. Various controls can be added to the system to render its operation automatic and dependent upon temperature and pressure conditions within the system.

BACKGROUND OF THE INVENTION

This invention relates to the heating of liquids and particularly to the heating of viscous sugar-containing liquids to render them less viscous and thus more freely flowable.

Sugar-containing liquids, such as sucrose solutions, are used in various food procesisng industries. Examples are the baking, soft drink, and candy industries. Blackstrap molasses, another sugar-containing liquid, is utilized in the animal feed industry. These liquids can become very viscous and virtually nonflowable when they become cold.

Generally, viscous sugar-containing liquids are stored in large containers capable of holding 1,000 to 20,000 gallons or more. Such containers are not usually housed in heated enclosures but are normally exposed to ambient conditions. The cold flowability of such viscous liquids is a major problem in almost all parts of the country during at least a few months of the year when ambient temperatures average 50° F., or less. For example, when blackstrap molasses reaches a temperature of 50° F. or less it becomes very viscous. The increased viscosity at or below this temperature renders procesisng of the molasses more difficult and less economical. Power consumption for pumps and the like is greatly increased. In addition, flow rates and other process variables can be adversely affected. As ambient temperatures approach 30° F. and less, blackstrap molasses becomes so viscous that it is virtually impossible to economically pump or to efficiently control.

Various attempts have been made to cure the cold flowability problem without adversely affecting the solids content of the sugar-containing liquids. One such attempt has been to introduce electric resistance immersion heaters into molasses storage containers. Such heaters generate very high temperatures and will cause crystallization of dissolved sugars and other dissolved solids around the areas of contact between the molasses and the heaters. In addition, since immersion heaters develop relatively high temperatures and since molasses is made up of a high proportion of solids, a scorching or burning effect can occur which adversely affects the palatability of the material when used in animal feeds.

Another attempt to rectify the cold flowability problem has been to wrap the lower portion of storage containers and the outlet conduits with electric heating tapes or to warm the containers and conduits with gas fired heaters. Both of these alternatives heat the molasses to undesirably high temperatures in localized regions. At 110° F. for example, dissolved solids in molasses solutions will begin to crystalline. Precipitative crystallization will occur in proximity of the portion of the container being heated and will eventually cake or cause a solid buildup in the bottom of the container. Such crystalization will eventually cause outlet conduits and other small diameter process conduits to become plugged.

The same drawbacks outlined above occur when utilizing hot water or steam coils to heat molasses. In addition, crystalline buildup on heat transfer surfaces will adversely affect the heat transfer characteristics of such heating coils. Steam or hot water is not introduced directly into molasses because the concentration of solids will be undesirably diluted, thus making process control difficult.

SUMMARY OF THE INVENTION

The present invention overcomes the drawbacks enumerated above. The invention provides a simple, clean, noncontaminating, relatively inexpensive means by which molasses and other viscous sugar-containing liquids can be rendered more flowable under cold ambient conditions.

The present invention therefore provides a method and apparatus for heating viscous sugar solutions. The method for heating a viscous liquid sugar solution to reduce its viscosity comprises mechanically compressing air and heating it to a temperature of less than about 200° F., and introducing the air into a sugar-containing liquid near the bottom of a container therefor to heat the liquid. In a preferred embodiment the method further comprises extracting the air being compressed and heated from the free air space in the container, thereby forming a substantially closed circuit system.

The apparatus for decreasing the viscosity of a viscous sugar-containing liquid comprises a high volume, relatively low pressure, positive displacement gas compressor having an inlet and an outlet, motive means for driving the compressor, a conduit means in fluid communication with the outlet of the pump and with a container for the sugar solution below the liquid line therein, and a throttling valve in the conduit means. The invention encompasses the use of temperature sensing means and pressure sensing means for controlling the motive means.

BRIEF DESCRIPTION OF THE DRAWINGS

FIG. 3 is an elevation view in partial cross section of an alternate form of the invention;

FIG. 4 is a cross sectional view of FIG. 3 along section line 4—4;

FIG. 5 is an elevation view in partial cross section of another alternative to the present invention; and FIG. 6 is a cross sectional view of FIG. 5 along section line 6—6.

DETAILED DESCRIPTION OF THE INVENTION

Figure 1:
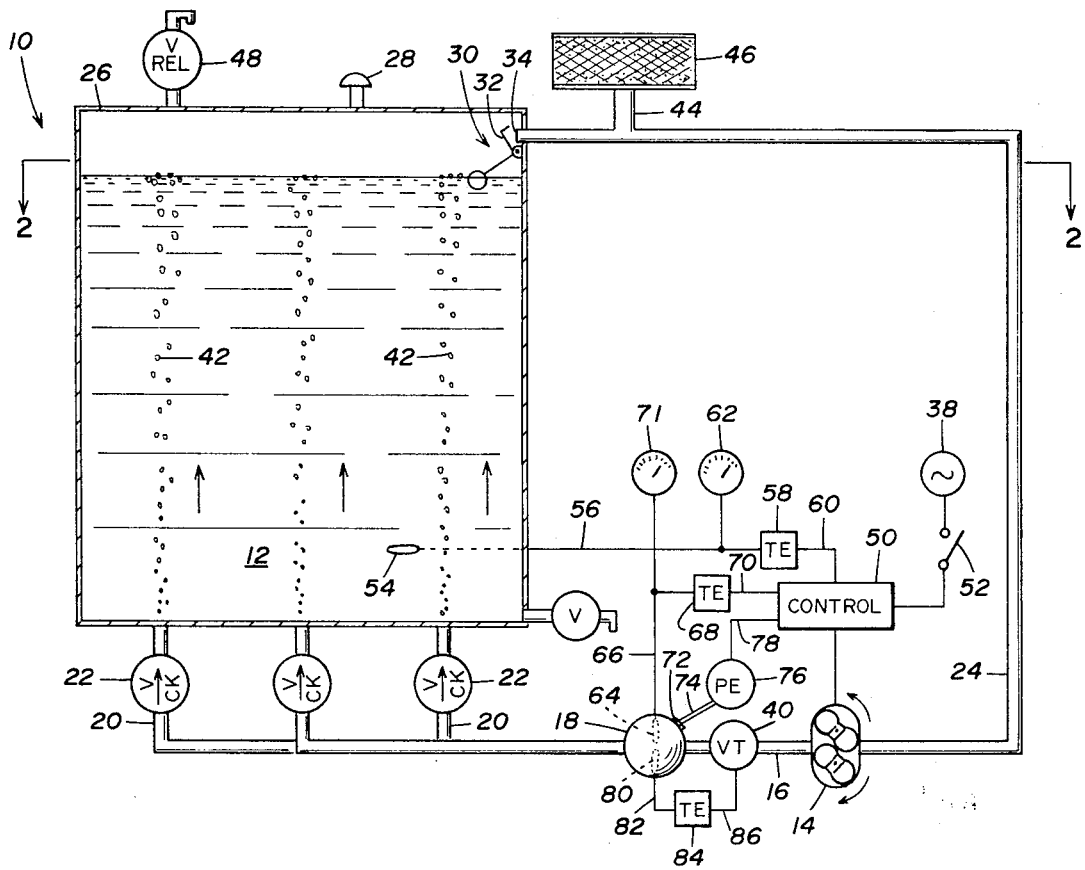
FIG. 1 is an elevation view in partial cross section of a container for a liquid and heating means for the liquid in accord with the present invention.
Figure 2:
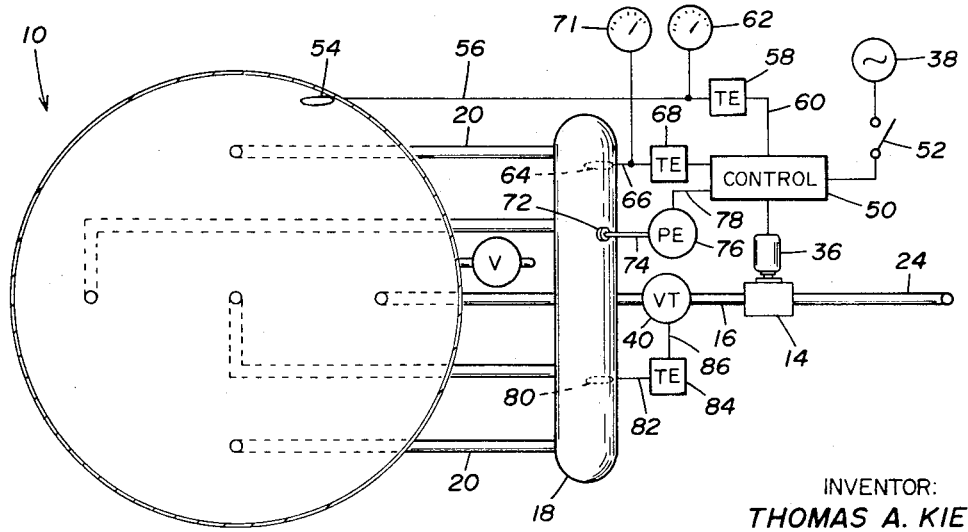
FIG. 2 is a cross sectional view of FIG. 1 taken along section line 2—2.

Referring now to FIGS. 1 and 2, a container 10 in the form of a cylindrical storage tank is shown partially filled with blackstrap molasses 12. The container 10 can be of any capacity. The present invention has been employed with tanks as small as 500 gallons and as large as 20,000 gallons or more. In a preferred embodiment a positive displacement, rotary, straight lobe, compressor 14 is connected to an outlet conduit 16. A throttling valve 40 or other suitable device for creating back pressure on the compressor 14 is situated in the conduit 16. The conduit 16 is fluid connected to a manifold 18 which is in turn connected to a plurality of header pipes 20. Each of the header pipes is fluid connected to the bottom of the container 10 via check valves 22. When the system is not in operation, the check valves 22 prevent back flow of the molasses 12 into the header pipes 20.

The inlet to compressor 14 is connected to a conduit 24 which is in turn fluid connected to a free air space 26 above the molasses 12 in container 10.

In the preferred form of the invention, the free air space 26 will be present. Thus, the container 10 preferably will never be filled to capacity with molasses 12. However, if the container 10 should happen to be filled completely with molasses through filler tube 28, a float valve 30 is provided which is responsive to the level of molasses 12 in container 10. If the level of molasses 12 should reach a predetermined height, the closure member 32 on the float valve 30 will cover the inlet 34 of conduit 24 to prevent molasses from entering the conduit 24.

The compressor 14 is driven by a motor 36, preferably an electric motor powered from a source 38. In basic operation the motor 36 is energized thus causing the compressor 14 to draw air from the free air space 26 through conduit 24. Utilizing air from air space 26 will permit closed circuit operation. Back pressure is exerted upon the compressor 14 by throttling valve 40 situated in conduit 16. In addition, back pressure is provided by the column of liquid molasses 12 with which the outlet of compressor 14 is in fluid communication. The back pressure causes mechanical compression and heating of the air in the compressor 14. The compressed air is transmitted to the manifold 18. It then flows through the header pipes 20 and check valves 22 into the bottom of the container 10. The compressed air contacts the column of molasses 12 and rises toward the free air space 26. As the air rises through the liquid column, it conductively transfers heat to the molasses directly across the air-molasses interface. The moving air will also cause circulation of the molasses within the column, thus preventing stagnation in any part of the container 10. Preferably a plurality of inlet ports leading from the check valves 22 are provided to distribute the total volume of air entering the container over a larger area, thus increasing the heat transfer rate. The inlet ports preferably have a relatively large diameter, on the order of one to two inches. This will tend to prevent crystallization around the outlet of the ports. The inlet ports leading from check valves 22 can also be made from polytetrafluoroethylene (sold under Dupont's trademark Teflon) which will prevent particulate or crystalline material from adhering to the ports.

Exemplary operating conditions for a typical compressor of the preferred type will include an air flow of about 100 cubic feet per minute at about 15 p.s.i.g. To accomplish this a 10 horsepower electric motor is utilized. Under these conditions the outlet temperature of the compressed and heated air will be in the range of about 180° F. to 200° F. Utilizing these conditions, 17,000 gallons or 79.5 Brix molasses can be raised about 20° F. in temperature in about 30 to 45 minutes. This occurs with little or no crystallization, sedimentation or scorching.

In the preferred form of the invention, a surge connection 44 can be provided on conduit 24. The surge connection 44 communicates with the atmosphere through filter 46. The surge connection 44 fulfills a two-fold purpose. First, if the liquid level of the molasses 12 should rise above the predetermined level causing closure of inlet 34 to conduit 24, the system can still remain in operation by drawing air through filter 46 into surge conduit 44. In this case air is exhausted from container 10 by pressure relief valve 48 to the atmosphere. Second, when beginning normal operation of the system a slight amount of make-up air is needed. This air is provided via surge connection 44. After start-up the system will equilibrate creating a no-flow condition in the surge connection 44. After the system has ceased operation there will be excessive pressure created in the system which is vented to atmosphere via surge connection 44. This venting aspect will also provide a self-cleaning action for the filter 46. As air flows out of the filter 46, contaminant particulate material entrained therein will be blown from the filter 46.

Various controls can also be associated with the system illustrated in FIGS. 1 and 2. For example, an electric motor control 50 can be provided to energize and deenergize the motor 36. Electric power is supplied from the source 38 through a primary switch 52 to control box 50. Circuitry within the control box 50 is conventional and can consist of various control mechansims, relays and associated circuitry. To control the compressor output, a suitable temperature sensor 54 can be immersed in the molasses 12. A relay line 56 extends from the sensor 54 to a temperature-electric relay 58 which converts the temperature signal to a proportional electric signal. In turn the electric signal is relayed via line 60 to the control box 50. In one mode of operation, the control can be suitably designed to deenergize the compressor motor 36 when the molasses 12 reaches a predetermined maximum temperature. In most instances this temperature will be in the range of 70° to 90° F. Visual readout of the temperature of the molasses 12 can also be provided via gauge 62 connected to fluid relay line 56.

A safety relay temperature device can be provided to prevent the temperature of the air entering the container 10 from exceeding a predetermined maximum. If the temperature exceeds 200° F. it is desirable to cease operating the compressor to prevent scorch damage to the molasses. It is therefore preferable to maintain the inlet temperature of the air into the container 10 below a maximum of about 200° F. This function can be provided by a temperature sensor 64 situated in air manifold 18. A fluid relay line 66 extends to a temperature-electric relay 68 which in turn transmits a signal along line 70 to motor control 50. The motor control will deenergize motor 36 upon a signal from line 70 indicating a maximum temperature of 200° F. Visual readout of the manifold air temperature is provided by gauge 71 connected to line 66.

If any of the components of the system should fail it would be possible for the pressure buildup in the downstream side of the system from compressor 14 to exceed desirable maximums. In such an instance a pressure sensor 72 is provided which senses the pressure in air manifold 18. The pressure signal is transmitted along relay line 74 to pressure-electric relay 76 which in turn transmits an electric signal to control box 50 along line 78. The motor control 50 will deenergize the compressor motor 36 when the signal in line 78 is proportional to a predetermined maximum pressure.

In another aspect of the present invention the temperature of the air in manifold 18, and thus the temperature of the air introduced into the molasses 12, can be automatically controlled. The throttling valve 40 can be provided with a suitable conventional electrically operated proportional control mechanism. This mechanism can be coupled to a temperature sensor 80 situated in the air manifold 18. The temperature sensor 80 transmits a signal along line 82 to temperature electric relay 84. Relay 84 converts the temperature signal to a proportional electric signal indicative of the temperature in manifold 18. This electric signal is relayed along line 86 to a suitable electric valve control mechanism associated with throttling valve 40. Thus the valve can be opened if the air temperature in manifold 18 exceeds a predetermined maximum and can be closed down to cause further heating of the air when the air in manifold 18 decreases below a predetermined minimum. For molasses it is preferred that the air temperature as it enters the container 10 be in the range of about 180° to about 200° F.

Referring now to FIGS. 3 and 4 a tank or container 100 is illustrated. It includes an outlet conduit 102 containing a shut off valve 104. A compressor inlet conduit 106 having filter element 108 therein is connected to the inlet of rotary lobe pump 110. In this embodiment the inlet conduit 106 draws air from the atmosphere through the filter 108. The rotary lobe compressor 110 is driven by motor 112 powered from source 114 through control box 116. The compressor outlet conduit 118 has a throttling valve 120 coupled thereto. A check valve 122 as well as a pressure relief valve 124 are also coupled into the compressor outlet conduit 118.

A deflector, generally indicated as 126, is positioned in the lower portion of the interior of tank 100. The deflector 126 includes a bottom frustoconical shell portion 128. A cylindrical shell portion 130 is connected to the top of the frustoconical portion 128. The bottom of the frustoconical portion 128 is spaced from the bottom of the tank 100. The cylindrical shell portion 130 terminates well below the average liquid level 132 in the tank 100. The compressor outlet conduit 118 extends into the interior of frustoconical portion 128. It has two outlets 134 spaced from each other and positioned under the frustoconical portion 128. The hot air produced by compressor 110 is directed into the deflector 126 and travels upwardly in the direction of arrows 136 until it reaches the surface 132 of the liquid. Air is exhausted from the container via exhaust conduit 140.

By utilizing the deflector 126, better heat transfer can be achieved. The flow of air in direction of arrows 136 rises centrally within the liquid column causing the liquid near the peripheries of the tank 100 to flow downwardly in the direction of arrows 142. The liquid flowing downwardly will be colder and will enter the bottom of the deflector 126. Thereafter the liquid will rise through the center thereof to be heated by the air issuing from outlets 134.

In the embodiment shown in FIGS. 5 and 6 a horizontal cylindrical tank 150 is illustrated. The tank is filled with a sugar-containing liquid 152 having an upper level 154. A rotary lobe compressor 156 draws air from the atmosphere through filter 158 and inlet conduit 160. It is driven as above by a motor powered through a control box and appropriate power source. The outlet conduit 162 of the compressor 156 leads to a throttling valve 164 and into a manifold 168. A plurality of header conduits 170 containing check valves 172 introduce air into the bottom of tank 150. The hot air produced by the compressor 156 is bubbled through the liquid 152 in the tank 150 and collects in the free air space 174. Excess pressure in this free air space is relieved through vent 176. This embodiment illustrated the application of the present invention to a horizontal storage container without the use of baffles.

As will be apparent to those of ordinary skill in the art, the present invention includes several advantages over the prior art. Among those advantages are a small capital investment for heating equipment, inexpensive operation, relatively troublefree operation, relatively good process control and the ability to operate in a closed noncrystallizing system. It is understood that those of ordinary skill in the processing arts using sugar-containing liquids will be able to effect various substitutions of equivalents, modifications, alterations of process variables and other changes with respect to the present invention. It is intended that the invention be limited only by the definition contained in the appended claims.

What is claimed is:

1. A method for heating a viscous sugar-containing liquid to reduce its viscosity comprising:
   mechanically compressing air and heating it to a temperature of less than about 200° F.,
   introducing said air into a viscous sugar-containing liquid near the bottom of a container therefor to heat said liquid.

2. The method of claim 1 further comprising: heating said solution to a temperature of from about 70° F. to about 90° F.

3. The method of claim 1 wherein said air is heated to a temperature in the range of about 180° F. to about 200° F.

4. The method of claim 3 wherein the amount of air introduced into said liquid is in the range of from about 3 to about 10 cubic feet per minute per thousand gallons of solution.

5. The method of claim 1 wherein said solution is a closed container, the method further comprising:
   extracting said air being compressed and heated from the free air space in said container, thereby forming a substantially closed circuit system.

6. The method of claim 5 further comprising:
   adding air to said system when initiating compression and venting excess air when ceasing compression.

7. In an apparatus for decreasing the viscosity of a viscous sugar-containing liquid including a storage container therefor and a discharge conduit including a valve in communication therewith the improvement comprising:
   a high volume relatively low pressure, positive displacement, gas compressor having an inlet and an outlet,
   motive means for driving said compressor,
   a first conduit means in fluid communication with the outlet of said pump and with said container below the liquid line therein, and
   a throttling valve in said first conduit means.

8. The apparatus of claim 7 further comprising:
   check valve means in said first conduit means near said container for preventing back flow of said viscous liquid into said first conduit means.

9. The apparatus of claim 7 wherein said compressor is a lobe-type positive rotary blower.

10. The apparatus of claim 7 further comprising:
    relief means in fluid communication with said first conduit means for relieving pressure therein when said pressure exceeds a predetermined value.

11. The apparatus of claim 7 wherein said baffle member comprises an elongate conduit means open at both ends, extending in an upright direction less than the liquid height in said tank, the bottom of said baffle member spaced from the bottom of said tank, said first conduit means opening into said baffle member.

12. The apparatus of claim 7 wherein said first conduit means includes a manifold downstream of said throttling valve, a plurality of conduits leading from said manifold to said tank, each of said plurality of conduits having a check valve therein.

13. The apparatus of claim 7 further comprising:
    first temperature sensing means for sensing the temperature of said liquid in said container and generating a first signal proportional thereto,
    means responsive to said first signal for controlling said motive means.

14. The apparatus of claim 7 further comprising:
    pressure sensing means for sensing the gas pressure in said first conduit means and for generating a third signal proportional thereto,
    means responsive to said third signal for stopping said motor means when the gas pressure exceeds a predetermined value.

15. The apparatus of claim 7 further comprising:
    a second conduit means in fluid communication with the inlet of said compressor and in fluid communication with said tank above said liquid level line.

16. The apparatus of claim 15 further comprising:
    a surge relief port in fluid communication with said second conduit, said port comprising a conduit including filter means for preventing particulate contamination of fluid in the container-conduit-compressor system.

17. The apparatus of claim 7 further comprising:
    a baffle member mounted in said tank having an opening in the middle thereof, said first conduit extending into said tank below said baffle member.

18. The apparatus of claim 17 wherein said baffle member has a frustoconical wall portion tapering inwardly and upwardly, said baffle member open at the bottom thereof and spaced from the bottom of said container, said opening in the top center of said baffle, said first conduit means opening into the interior of said baffle member.

19. The apparatus of claim 7 further comprising:
second temperature sensing means for sensing the temperature of gas in said first conduit means and generating a second signal responsive thereto,
means responsive to said second signal for controlling said motive means.

20. The apparatus of claim 19 further comprising:
means responsive to said second signal for controlling the amount said throttling valve is opened to maintain a predetermined gas temperature in said first conduit means.

References Cited

UNITED STATES PATENTS

| | | | |
|---|---|---|---|
| 659,241 | 10/1900 | Lillie | 127—9 X |
| 1,792,450 | 2/1931 | Stich | 261—124 X |
| 2,630,819 | 3/1953 | Norcross | 137—92 |
| 2,710,724 | 6/1955 | McMahon | 137—90 X |
| 2,711,750 | 6/1955 | Norcross | 137—92 |
| 3,506,484 | 4/1970 | Domsa | 261—124 X |

OTHER REFERENCES

Sugar Industry Abstracts, 15: 363, p. 89, (1963).

MORRIS O. WOLK, Primary Examiner

S. MARANTZ, Assistant Examiner

U.S. Cl. X.R.

23—253 A; 127—46 R; 137—90, 92; 261—124, 127